United States Patent [19]

Smith, Jr.

[11] 4,181,969
[45] Jan. 1, 1980

[54] SYSTEM FOR DETECTING AND ISOLATING STATIC BIT FAULTS IN A NETWORK OF ARITHMETIC UNITS

[75] Inventor: Winthrop W. Smith, Jr., Catonsville, Md.

[73] Assignee: Westinghouse Electric Corp., Pittsburgh, Pa.

[21] Appl. No.: 870,531

[22] Filed: Jan. 18, 1978

[51] Int. Cl.² .......................................... G06F 11/00
[52] U.S. Cl. ............................................... 364/739
[58] Field of Search ...................... 364/739, 737, 724; 235/304, 307

[56] References Cited

U.S. PATENT DOCUMENTS

| | | | |
|---|---|---|---|
| 2,919,854 | 1/1960 | Singman | 364/739 |
| 3,602,704 | 8/1971 | Kurina et al. | 364/739 |
| 3,814,923 | 6/1974 | Wang | 364/739 |
| 3,816,728 | 6/1974 | Chen et al. | 364/739 |
| 3,873,820 | 3/1975 | Parr et al. | 364/739 |

OTHER PUBLICATIONS

Rao, Biresidue Error–Correcting Codes for Computer Arithmetic, IEEE Trans. on Computers, vol. C-19, No. 5, May 1970, pp. 398–402.
Gaddess, An Error–Detecting Binary Adder; A Hardware Shared Implementation, IEEE Trans. on Computers, vol. C-19, No. 1, Jan. 1970, pp. 34–38.
Langdon, Jr., et al., Concurrent Error Detection for Group Look–Ahead Binary Adders, IBM J. Res. Develop., Sep. 1970, pp. 563–573.
Avizienis, Arithmetic Algorithms for Error-Coded Operands, IEEE Trans. on Computers, vol. C-22, No. 6, Jun. 1973, pp. 567-572.

Primary Examiner—Charles E. Atkinson
Attorney, Agent, or Firm—W. E. Zitelli

[57] ABSTRACT

A digital processor comprising a network of arithmetic units and including apparatus for detecting and isolating a static bit fault therein is disclosed. A plurality of first arithmetic units of the network employ non-linear type operations. Each of the first arithmetic units arithmetically operate on a corresponding number of the binary coded digital input words of the network to produce a first output binary coded digital word which is coupled to the remaining network of arithmetic units. Corresponding to each of the first arithmetic units, there is provided a modulo 3 model to emulate in modulo 3 arithmetic the operation thereof and to compare the result of the modulo 3 emulation with the modulo 3 equivalent of a preselected word from the corresponding first arithmetic unit, the preselected word being intermediate the non-linear operation performed thereby. A non-equivalence condition resulting from the comparison is indicative of a static bit fault. Another modulo 3 model is provided to emulate in modulo 3 arithmetic the remaining network of arithmetic units by processing the second output words and the modulo 3 equivalent of the corresponding at least one input word. The another modulo 3 model compares the result of its emulation to the modulo 3 equivalent of the corresponding at least one output word for a non-equivalence condition which is also indicative of a static fault. The comparisons are monitored for non-equivalence conditions to detect a static bit fault and isolate the source of the detected static bit fault.

20 Claims, 9 Drawing Figures

SYSTEM FOR DETECTING AND ISOLATING STATIC BIT FAULTS IN A NETWORK OF ARITHMETIC UNITS

BACKGROUND OF THE INVENTION

This invention relates to a system for detecting and isolating a static bit fault in a digital processing system, and more particularly to the use of modulo 3 model emulations of both linear and non-linear arithmetic functions of the digital processor for detecting and isolating static bit faults therein.

Special purpose digital processors are sometimes used in high security surveillance, communication and control fields such as that in connection with advanced warning radar and control systems, for example. In these type of radar signal processors, certain essential information such as the doppler and range of the target is extracted from return echo signals while controlling the filtering of the noise level of the extraneous clutter associated with the environment. It is apparent that an undetected fault in the digital signal processor may lead to misinformation provided to the radar system resulting in seeking an incorrect target or overlooking an important target, for example. It can be appreciated then that the integrity of this hardware must be unquestionable; therefore, frequent monitoring of these systems are presently carried out for the detection and isolation of static bit faults which could go undetected and provide misinformation if not uncovered.

Static bit faults are sometimes referred to as "stuck at" faults in the case of hardware digital processors wherein a piece of hardware fails in a sense in which one of the bits of its digital input or output circuits is fixed at either a "1" or a "0" being unresponsive to the normal transfer pattern of digital information. In these digital processors, it can be shown that many static bit "stuck at" faults can be propagated throughout the entire processing system. It is not uncommon to expect a number of areas within the hardware digital processor to appear as being faulty. Accordingly, then it is not necessary only to detect that a fault has occurred, but further to isolate the source of the fault from all of the faulty signals resulting from the propagation of the fault through the processing system.

One presently known system dealing with the detection and isolation of static bit faults within a complex radar signal processor is not capable of predicting the state of the output of the processor during on-line operation. Therefore this type of fault detection and isolation system periodically takes the hardware processor off-line for testing; that is, the digital processor is interrupted from its normal function and isolated from its actual real time input and output couplings. This off-line testing generally entails introducing sequentially to the inputs of the processor a preprogrammed set of digital words, the results of which that are expected to occur at predetermined observable points within the processing system are known. Typically, with the introduction of each digital input bit pattern of "1's" and "0's", a resulting bit pattern of "1's" and "0's" in the form of digital words are rendered at each predetermined observable point. A one-to-one bit comparison check is performed between the actual resulting bit pattern and that bit pattern which is expected for each observable point and any anomaly in the bit comparison check is an indication that a static bit fault has occurred in the digital processor. The topological search to uncover the source of the static bit fault within the digital processor is then undertaken and is considered a very complicated task.

One such system which is used to detect and isolate static bit faults in a complex digital hardware processor uses an externally supplied programmed digital computer and includes all of the peripheral hardware which is used to take the hardware processor off-line and control the synchronism of the sequential off-line testing procedure as described hereabove. This system requires memory in the hundreds of thousands of digital words to store programmed instructions and data essential to its operation. In addition, the input test sequence of data bit patterns is in the majority of cases derived heuristically because these type hardware processors are so complex and unwieldy to treat mathematically or simulate. For example, one might expect at least a quarter of a million possible static bit faults to occur in these type hardware processor systems.

In the late sixties and early seventies a number of technical papers were written, similar to the one written by G. G. Langdon, Jr. and C. K. Tang; entitled "Concurrent Error Detection For Group Look-Ahead Adders"; published in the IBM Journal of Research & Development, V. 14, N. 5, pp. 563–573 in September 1970, in which linear arithmetic digital hardware operation, such as adders and multipliers, were modeled by modulo 3 equivalent systems to detect and isolate errors in the arithmetic functions of the digital processors. However, there appears to be no attempt in these papers to extend these modulo 3 models to non-linear operations, such as round-off and saturation which are normally associated with digital linear arithmetic functional units. It is felt that if the modulo 3 equivalent models could be extended to the non-linear operations normally employed by a majority of the arithmetic functions in a digital processor like a radar signal doppler processor, for example, this type of fault detection and isolation would be a viable means in offering a step toward keeping the digital processor on-line during the testing procedure while reducing the amount of externally supplied peripheral test equipment significantly.

It is additionally believed that a large percentage of the time and effort involved in the heuristic development of the preprogrammed input sequence and corresponding result sequence of data words used for the bit comparison testing the hardware integrity of these type digital processors may be eliminated. The utilization of modulo 3 type models in the arithmetic units of the digital processor may additionally be beneficial in the isolation of the source of a detection "stuck at" bit fault in the processor by reducing the number of the fault detections throughout the processor. In the present system just described, this fault propagation will cause fault detections at various observable points within the hardware digital processor making the task of isolating the fault source difficult and time consuming.

SUMMARY OF THE INVENTION

In accordance with the present invention, a digital processor comprising a network of arithmetic units and including apparatus for detecting and isolating a static bit fault condition therein is provided. The digital processor comprises a first portion of arithmetic units employing non-linear operators for arithmetically operating on a first set of binary coded digital words to generate a plurality of output digital words which are correspondingly associated with the non-linear operation performed therein; and a second portion of arithmetic units for arithmetically operating on at least one input binary coded digital word and the output digital words generated from the first portion of arithmetic units to generate at least one output binary coded word.

A first modeling means is provided for each arithmetic unit employing a non-linear operation. Each first modeling means processes the modulo 3 equivalents of the inputs of its corresponding arithmetic unit in accordance with a modulo 3 arithmetic emulation to generate a first modulo 3 coded result. In addition, each first modeling means is operative to compare its first modulo 3 coded result with the modulo 3 equivalent of a preselected binary word intermediate to the non-linear operation performed in the corresponding arithmetic unit to detect a condition of non-equivalence which is representative of a static bit fault. Still further, each first modeling means generates a modulo 3 representation of a predetermined portion of the preselected binary word, said predetermined portion being related to the non-linear operation performed in the corresponding arithmetic unit.

A second modeling means is provided for the second portion of arithmetic units to process the modulo 3 representations generated by the first modeling means and the modulo 3 equivalents of the at least one input digital word in accordance with a modulo 3 arithmetic emulation of the arithmetic operations of the second portion of arithmetic units to generate at least one modulo 3 coded result. In addition, the second modeling means is operative to compare its at least one modulo 3 coded result and the modulo 3 equivalent of the at least one output binary word generated from the second portion of arithmetic units to detect a condition of non-equivalence which is representative of a static bit fault.

A monitoring means is further provided to detect the presence of at least one non-equivalence condition in the first and second modeling means and the presence of the particular non-equivalence condition which will isolate which portion of arithmetic and modeling units is at fault within the digital processor.

DESCRIPTION OF THE PREFERRED EMBODIMENT

CONVERSION OF SIGNED AND UNSIGNED BINARY Words to Their Modulo 3 Equivalent

The case of unsigned binary (positive) numbers will first be considered. Thus, a binary coded digital word A may be mathematically written as $$A = \sum_{j=0}^{n-1} a_j 2^j \equiv \sum_{j=0}^{n-1} (-1)^j a_j \bmod 3, \tag{1}$$

where $a_j = 0$ or 1. Since $-1 \equiv 2 \bmod 3$ we can rewrite (1) as $$A \equiv \sum_{\substack{j=0 \\ j \text{ even}}}^{n-1} a_j \bmod 3 + \sum_{\substack{j=0 \\ j \text{ odd}}}^{n-1} 2a_j \bmod 3. \tag{2}$$

For n even, equation (2) can be rewritten as $$A \equiv \left\{ \sum_{j=0}^{\frac{n}{2}-1} (a_{2j} + 2a_{2j+1}) \right\} \bmod 3, \tag{3}$$

and for n odd, equation (2) can be rewritten as $$A \equiv \left\{ \sum_{j=0}^{\frac{n-1}{2}-1} (a_{2j} + 2a_{2j+1}) + a_{n-1} \right\} \bmod 3. \tag{4}$$

Equations (3) and (4) suggest a simple way to find the modulo 3 equivalent of the unsigned binary number A with either a hardware or software embodiment. Equations (3) and (4) show that each pair of bits in the binary representation of A ($a_0$, $a_1$, or $a_2$, $a_3$, etc.) is the mod 3 representation of that part of A and that the overall mod 3 representation of A is found by adding these pairs modulo 3. It has been found that read only memories (ROM) programmed with look up tables which may be used as an efficient method for performing the modulo 3 operation suggested in equations (3) and (4) shown above.

To illustrate the use of equation (3) consider the example where n is even and $$A = (a_0, a_1 \ldots a_{15}) = (1, 0, 0, 0, 1, 1, 0, 1, 1, 1, 0, 0, 1, 1, 1, 0). \tag{5}$$

Using equation (3) we find that the modulo 3 equivalents of the pairs of bits are:

$$(a_0, a_1) = 1 \quad (a_8, a_9) = 3$$
$$(a_2, a_3) = 0 \quad (a_{10}, a_{11}) = 0 \qquad (6)$$
$$(a_4, a_5) = 3 \quad (a_{12}, a_{13}) = 3$$
$$(a_6, a_7) = 2 \quad (a_{14}, a_{15}) = 1$$

such that the mod 3 equivalent of A equals (1+0+3+2+3+0+3+1) mod 3=1 mod 3 (see equation (3) above).

For the case of 2's complement signed words, it is known from the mathematics of modulo arithmetic that $-m$ may be represented by its actual modulo 3 equivalent. One possible method of performing this conversion is to consider the numerical portion of the 2's complement word just as with unsigned words, shift the sign bit one position to the left and add a zero (ghost bit) as the most significant bit of the numerical portion of the word. Using this rule, the entire number may be treated as an unsigned number discussed above. To show that this is true, consider an m bit word plus a sign bit plus a zero inserted in between the most significant bit and the sign bit. When the unsigned word goes from $2^m - 1$ to $2^{m+1}$, there is a change of $2^{m+1} - (2^m - 1)$ which results in a modulo 3 change of $$2^m(2-1) + 1 = 2^m + 1 \qquad (7)$$
$$= 2 \text{ mod } 3 \text{ for } m \text{ even}$$
$$= 0 \text{ mod } 3 \text{ for } m \text{ odd}.$$

This change corresponds to changing the actual signed word from $+2^m - 1$ to $-2^m$. This is a change of $-2^m - 1$ to $-2^m$. This is a change of $$-2^m - (2^m - 1) = -2^{m+1} + 1 \qquad (8)$$
$$= (1-2)(1+2+2^2+\cdots+2^m)$$
$$= -(1+2+2^2+\cdots+2^m).$$

For m odd, there are an even number of terms in $(1+2+\cdots+2^m)$ which means that $-(1+2+2^2+\cdots+2^m) \equiv 0 \text{ mod } 3$. For m even, there are an odd number of terms in $(1+2+\cdots+2^m)$ which means that $$-(1+2+2^2+\cdots+2^m) \equiv -1 \text{ mod } 3 \qquad (9)$$
$$\equiv 2 \text{ mod } 3.$$

These results match equation (7) and thus the original supposition is believed proven. Tables 1A and 1B below show examples of the conversions based on equation (7) for m even and odd, respectively.

TABLE 1A

| Modified Word Unsigned Mod 3 | Modified Binary Wd. | Actual No. | Actual Mod 3 |
|---|---|---|---|
| 0 | 0 0 1 1 1 1 = | +15 = | 0 |
| 2 | 0 0 1 1 1 0 = | +14 = | 2 |
| 1 | 0 0 1 1 0 1 = | +13 = | 1 |
| 0 | 0 0 1 1 0 0 = | +12 = | 0 |
| 2 | 0 0 1 0 1 1 = | +11 = | 2 |
| 1 | 0 0 1 0 1 0 = | +10 = | 1 |
| 0 | 0 0 1 0 0 1 = | +9 = | 0 |
| 2 | 0 0 1 0 0 0 = | +9 = | 2 |
| 1 | 0 0 0 1 1 1 = | +7 = | 1 |
| 0 | 0 0 0 1 1 0 = | +6 = | 0 |
| 2 | 0 0 0 1 0 1 = | +5 = | 2 |
| 1 | 0 0 0 1 0 0 = | +4 = | 1 |
| 0 | 0 0 0 0 1 1 = | +3 = | 0 |
| 2 | 0 0 0 0 1 0 = | +2 = | 2 |
| 1 | 0 0 0 0 0 1 = | +1 = | 1 |
| 0 | 0 0 0 0 0 0 = | 0 = | 0 |
| 2 | 1 0 1 1 1 1 = | −1 = | 2 |

TABLE 1A-continued

| Modified Word Unsigned Mod 3 | Modified Binary Wd. | Actual No. | Actual Mod 3 |
|---|---|---|---|
| 1 | 1 0 1 1 1 0 = | −2 = | 1 |
| 0 | 1 0 1 1 0 1 = | −3 = | 0 |
| 2 | 1 0 1 1 0 0 = | −4 = | 2 |
| 1 | 1 0 1 0 1 1 = | −5 = | 1 |
| 0 | 1 0 1 0 1 0 = | −6 = | 0 |
| 2 | 1 0 1 0 0 1 = | −7 = | 2 |
| 1 | 1 0 1 0 0 0 = | −8 = | 1 |
| 0 | 1 0 0 1 1 1 = | −9 = | 0 |
| 2 | 1 0 0 1 1 0 = | −10 = | 2 |
| 1 | 1 0 0 1 0 1 = | −11 = | 1 |
| 0 | 1 0 0 1 0 0 = | −12 = | 0 |
| 2 | 1 0 0 0 1 1 = | −13 = | 2 |
| 1 | 1 0 0 0 1 0 = | −14 = | 1 |
| 0 | 1 0 0 0 0 1 = | −15 = | 0 |
| 2 | 1 0 0 0 0 0 = | −16 = | 2 |

↑ ↑ Numerical Bits
↑ Ghost Bit
Sign Bit

TABLE 1B

| Modified Word Unsigned Mod 3 | Modified Binary Wd | Actual No. | Actual Mod 3 |
|---|---|---|---|
| 1 | 0 0 1 1 1 = | +7 = | 1 |
| 0 | 0 0 1 1 0 = | +6 = | 0 |
| 2 | 0 0 1 0 1 = | +5 = | 2 |
| 1 | 0 0 1 0 0 = | +4 = | 1 |
| 0 | 0 0 0 1 1 = | +3 = | 0 |
| 2 | 0 0 0 1 0 = | +2 = | 2 |
| 1 | 0 0 0 0 1 = | +1 = | 1 |
| 0 | 0 0 0 0 0 = | 0 = | 0 |
| 2 | 1 0 1 1 1 = | −1 = | 2 |
| 1 | 1 0 1 1 0 = | −2 = | 1 |
| 0 | 1 0 1 0 1 = | −3 = | 0 |
| 2 | 1 0 1 0 0 = | −4 = | 2 |
| 1 | 1 0 0 1 1 = | −5 = | 1 |
| 0 | 1 0 0 1 0 = | −6 = | 0 |
| 2 | 1 0 0 0 1 = | −7 = | 2 |
| 1 | 1 0 0 0 0 = | −8 = | 1 |

↑ ↑ Numerical Bits
↑ Ghost Bit
Sign Bit

Figure 1:
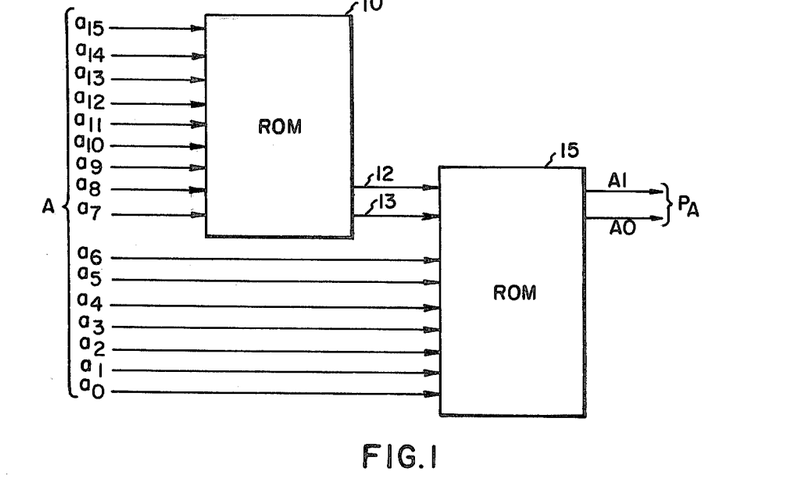
FIG. 1 is a schematic diagram of an embodiment for converting a binary coded digital word to its modulo 3 equivalent using read only memories.

One embodiment of this conversion technique in hardware as shown in FIG. 1 uses two ROM devices 10 and 15 each having a capacity of 512-4 bit digital words for converting a 16 bit signed or unsigned binary word (denoted by bits $a_0$ 14 $a_{15}$) to its modulo 3 equivalent. These ROM devices 10 and 15 may be similar to the type manufactured by Intersil Corp., Model No. IM 5624. The upper 9 bits ($a_7$–$a_{15}$) of the 16 bit binary word address registers within the read only memory 10 which have been preprogrammed to contain the modulo 3 equivalent of the bit pairs of the upper 9 bits ($a_7$–$a_{15}$) similar to that shown in connection with Table 1 and equation (6) shown above. The modulo 3 equivalent of the upper 9 bits ($a_8$–$a_{15}$) is yielded on output lines 12 and 13 which along with the lower 7 bits ($a_0$–$a_6$) of the 16 bit binary word become the address lines for the second ROM 15. The registers of ROm 15 are preprogrammed with the modulo 3 equivalent corresponding to the entire 16 bit binary word $a_0$–$a_{15}$ being addressed by bits $a_0$–$a_6$ and utlizing the intermediate modulo 3 equivalent word on address lines 12 and 13. Output lines A0 and A1 contain the modulo 3 equivalent $P_A$ of the 16 bit binary word A ($a_0$–$a_{15}$). It is pointed out that for the embodiment shown in FIG. 1 only two of the four register bits in the ROMS 10 and 15 are used to store the modulo 3 equivalents. It is understood that other combinations of ROM's having different storage capacity may be used without deviating from the conversion techniques described hereinabove.

STUCK AT FAULTS IN LINEAR ARITHMETIC UNITS

Linear arithmetic units used in digital hardware processors are normally comprised of operations such as addition, multiplication, delays . . . etc. Addition operations are normally implemented in hardware by cascading devices commonly known as full adders which may be of the type manufactured by Signetics Corp., Model No. 54283. Multiplication operations may employ hardware multipliers which may be of the type manufactured by American Micro Devices, Inc., Model No. 2505. It is understood that the number and array configuration of these type hardware multipliers to meet the multiplication requirements is generally provided by the manufacturer in technical application briefs which are accessible to anyone designing in the pertinent art area. Delay operations for digital hardware processors may be implemented by either use of shift register memories or random access memory structures, or example, both being well known to those skilled in the pertinent art area.

Figure 2:
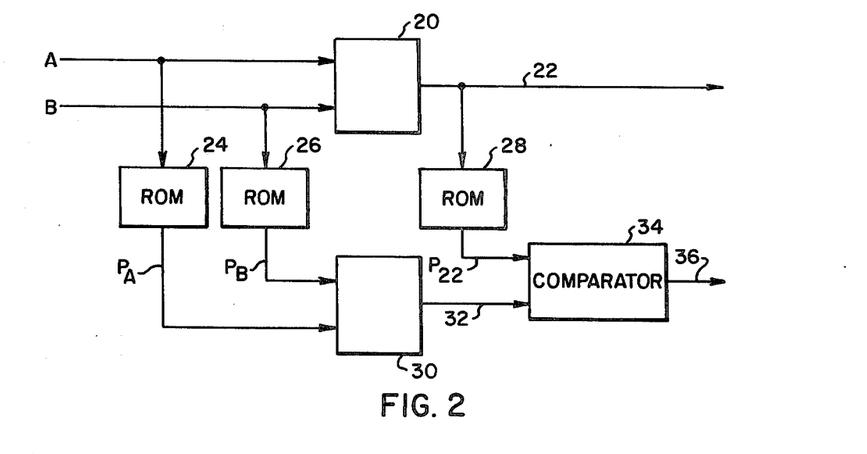
FIG. 2 is a schematic block diagram of an embodiment for detecting static bit faults in a linear arithmetic unit.

One such embodiment for detecting static bit faults or "stuck at" faults in a linear arithmetic unit, which has been proposed, is shown in FIG. 2. Two binary word inputs A and B are operated on by a linear arithmetic unit 20, which may be one of those described above, to yield an output binary word 22 which is the result of the arithmetic operation performed by 20 on A and B. The input binary words A and B and output word 22 are converted into their modulo 3 equivalents $P_A$, $P_B$ and $P_{22}$ using the ROM modules 24, 26 and 28, respectively, which have been preprogrammed in the same manner as that described in connection with FIG. 1. It is understood that while binary words A and B and resultant 22 may contain any number of binary bits dependent on the accuracy and resolution requirements of the digital processor, their modulo 3 equivalents $P_A$, $P_B$ and $P_{22}$, respectively, will always contain only two bits because the modulo 3 equivalent of any binary word can only be 00, 01, 10 or 11 (i.e. 0, 1 or 2). A modulo 3 model 30 of the linear arithmetic unit 20 operates on the modulo 3 input equivalents $P_A$ and $P_B$ to yield a modulo 3 coded resultant digital word 32 which should be equivalent to the bit pattern of the modulo 3 equivalent $P_{22}$ of the binary word 22 resulting from the linear arithmetic operation performed by unit 20. The comparator 34 compares the corresponding bits of the modulo 3 coded digital words $P_{22}$ and 32 for equivalence. If the input words $P_{22}$ and 32 are not bit for bit equivalent, the comparator 34 outputs an error signal over line 36 indicating that a static bit fault has occurred in either the linear arithmetic unit 20 or the units 24, 26, 28 and 30 associated with the modulo 3 equivalent model used for testing.

Some static bit faults or "stuck at" faults which may be considered to occur in the linear arithmetic units described hereinabove are failure in the clock, control or address lines of the shift register memories or random access memories used to implement the delay functions, or failure in the carry bits or input/output bits of the full adder or multiplier used to implement the functions of addition or multiplication, to name just a few. It is understood that some "stuck at" faults may cause the binary output word to change by $2^j$ in which case the modulo 3 equivalent of the output word will be changed by 1 or 2. However, in those cases in which a failure occurs to effectively cause several "stuck at" fault conditions in the binary output word, it appears that these j bits which are permanently stuck in one state may have $2^j$ possible values that subsequent binary output words are to assume. One third of these subsequent $2^j$ words have the correct modulo 3 representation even though the output word is only correct for one of $2^j$ words at the output if all output words are considered equally probable. This means that each subsequent binary output word that is caused to occur as a result of the arithmetic operations on the time varying inputs has about a $\frac{1}{3}$ probability of being correct modulo 3 and about $\frac{1}{2^j}$ probability of actually being correct. Thus for a sequence of M subsequent output words, there is a probability of $(\frac{1}{3})^M$ that all the words will have the correct modulo 3 value. This probability rapidly approaches zero as M increases. This may be better appreciated by referring to the figures in Table 2 found below.

TABLE 2

| M | $(\frac{1}{3})^M$ |
|---|---|
| 1 | 0.33 |
| 2 | 0.11 |
| 3 | 0.038 |
| 4 | 0.012 |
| 5 | 0.0041 |
| 10 | 0.000017 |

To exemplify this phenomenon, take the case in which a delay function is implemented in hardware by shift registers and a modulo 3 equivalent is used to detect "stuck at" bit faults in a similar manner to that described in connection with FIG. 1 except having only one input, say A for example. It is understood that there will be as many shift registers in parallel for unit 20 as there are bits of the input word A and for unit 20 as there are bits in the mod 3 equivalent of A. Should the clocking mechanism of the shift registers fail to clock one of the shift registers, then the effect is similar to a single bit "stuck at" condition which always causes a change in the mod 3 equivalent word. However, if the clocking mechanism of the shift registers fails to clock more than one of the shift registers, then effectively several "stuck at" bit faults will occur at the output in which case there is a probability that the mod 3 equivalent of the output may remain unchanged. But as has been explained above, the probability of this going undetected is remote as the number of subsequent output words are produced (see Table 2).

What has been discussed above is a proposed embodiment for detecting "stuck at" faults in linear arithmetic units of a hardware digital processor. No consideration has been given to the effects of non-linear operations such as roundoff and saturation which in a more practical sense are normally associated with certain linear arithmetic units for use in a digital processor. These non-linear effects and methods and apparatus for detecting faults in arithmetic units employing them will be discussed in great detail in the following section.

NON-LINEAR EFFECTS—ROUNDOFF

Roundoff is a common non-linear effect required in digital processors to control the bit lengths of binary word information. Since the bit length problem is normally associated with the output of a linear arithmetic unit, such as a multiplier for example, an embodiment for dealing with the non-linear effects of roundoff will be described in connection with FIG. 3 in terms of a multiplier output. The typical technique for accomplishing roundoff is to add one half of the least significant bit (of the final bit length binary word after roundoff) and then truncate the result. Table 3 illustrates a common roundoff procedure which rounds each number to its nearest integer and rounds 0.50 to the next higher integer. The hardware algorithm requires that we add a "1" to a bit $A_1$ and then truncate between $A_1$ and $A_2$. The roundoff for 7.50 and 7.75 in Table 3 depends on the particular digital processor being used (i.e. whether the processor permits saturation of the outputs of its arithmetic units).

Figure 3:
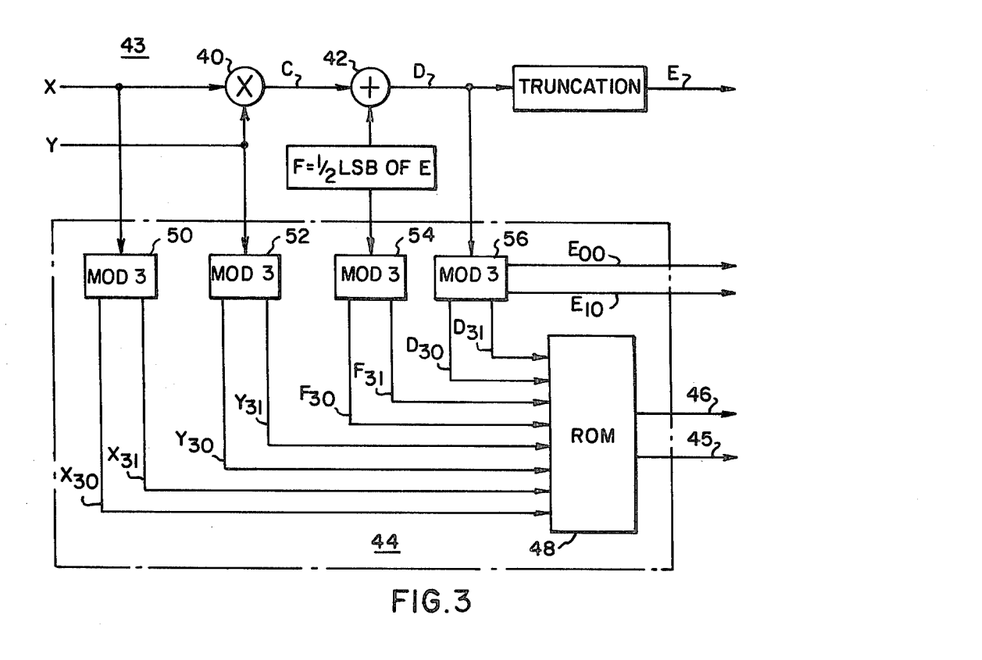
FIG. 3 is a schematic block diagram of an embodiment for detecting static bit faults in an arithmetic unit employing a non-linear operation.

Referring to FIG. 3, a binary digital word X of a 4 bit word length, for example, and a binary digital word Y of a 2 bit word length, for example, are two inputs to a 4×2 digital multiplier 40 which may be of the type manufactured by American Micro Devices, Inc. bearing Model No. 2505 which produces an output binary word C having a 6 bit word length ($C_0$–$C_5$), for example. A full adder 42 which may be of the type manufactured by Signetics Corp. bearing Model No. 54283 is used to add a "one" (F) to the $C_1$ bit of the output word C in accordance with the roundoff method as illustrated in Table 3 to produce a digital word (D) of a 6 bit word length $d_0$–$d_5$ which is then truncated by selecting only the upper four most significant bits of D (i.e. bits $d_2$–$d_5$) to form a binary word E. It is apparent that the binary output word E is merely a subset of the bits ($d_0$–$d_5$) available of the word D. Thus, for the case in which this arithmetic unit is isolated from the rest of the digital processor, it appears that it may be only necessary to monitor the digital word D in the context of a mod 3 model such as that exhibited in part in FIG. 3. However, if the arithmetic unit exhibited in FIG. 3 is connected interacting with a network of arithmetic units within a digital processor which is to be modeled completely by a modulo 3 machine, then the modulo 3 equivalent of E is to be additionally passed along to adjacent arithmetic units within said network. This will be more fully understood by the description of the specification found hereinbelow. Since attaining E from D is a non-linear operation, it is not considered possible to independently model this operation in a modulo 3 linear machine without taking into consideration the interaction with the other arithmetic units of the digital processor. However, it will be described below how one may model these non-linear operations with interaction between the actual arithmetic units and their modulo 3 models such that all "stuck at" faults may be detectable in both actual and modeled units as well as the checking apparatus.

Figure 5:
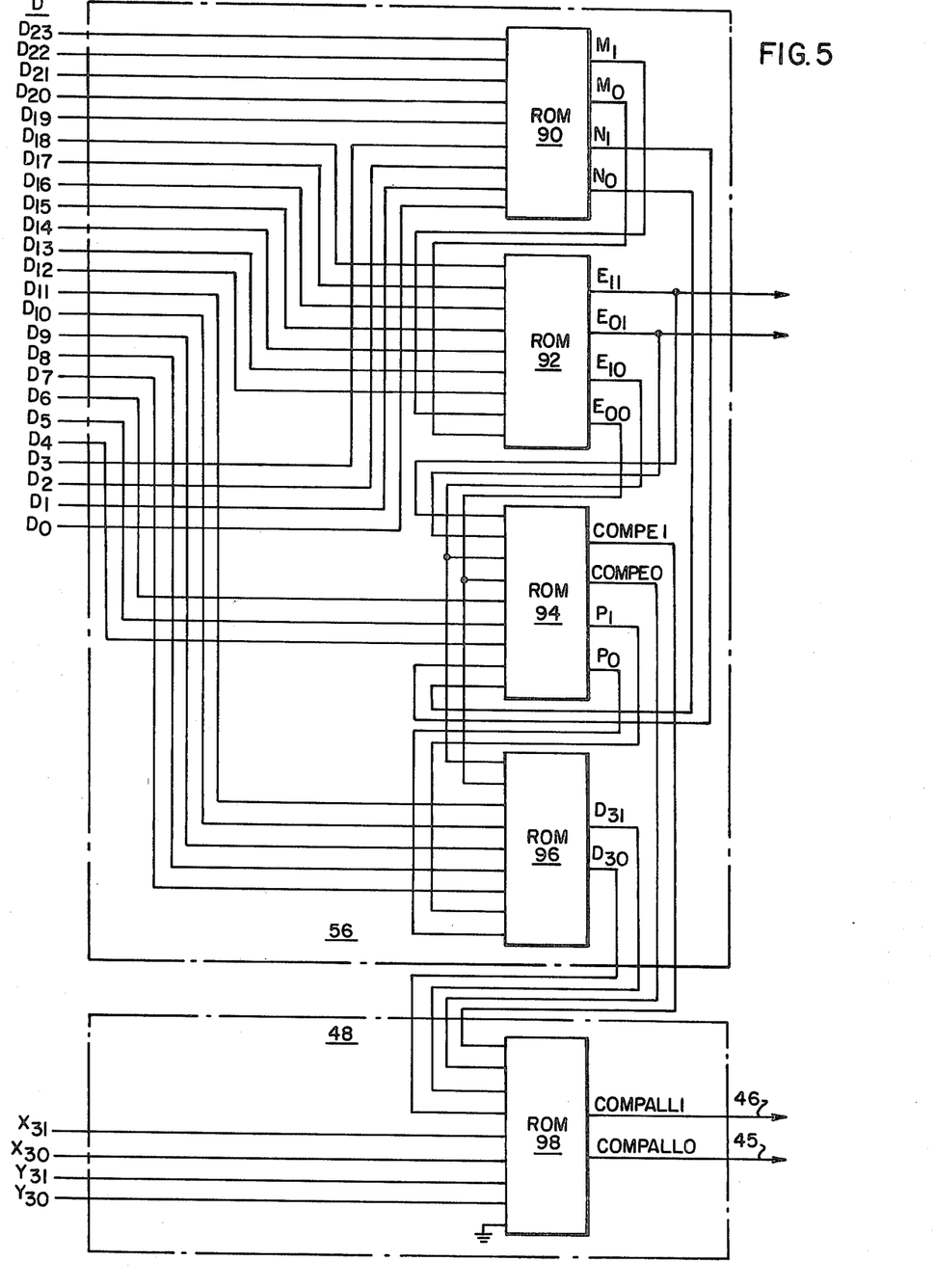
FIG. 5 is a schematic circuit diagram of a modulo 3 arithmetic model associated with a round-off non-linear operation suitable for use in an embodiment similar to the one depicted in FIG. 3.

Referring again to FIG. 3, a modulo 3 model 44 of the arithmetic unit 43 employing a non-linear operation provides a two bit word over signal lines 45 and 46 which by the bit pattern thereof indicates the presence of a "stuck at" bit fault in either the arithmetic unit 43, the modulo 3 model 44 including a checking apparatus 48 which for the purposes of this embodiment a combination of read only memories (ROM's) was found suitable (refer to FIG. 5). The 4-bit signal word X and 2-bit signal word Y may be connected to their modulo 3 equivalents $X_{30}$, $X_{31}$ and $Y_{30}$ and $Y_{31}$ using binary-to-modulo 3 conversion units 50 and 52, respectively. The conversion units 50 and 52 may be read only memories preprogrammed in accordance to a look-up table similar to that shown in Table 1 above having the respective 4-bit word X and 2-bit word Y as address inputs. The

TABLE 3

| Actual Number | 2'S Complement Binary Representation | | | | | | Actual Number | 2'S Complement Binary Representation | | | | | |
|---|---|---|---|---|---|---|---|---|---|---|---|---|---|
| 7.75 | 0 | 1 | 1 | 1 | 1 | 1 | −0.25 | 1 | 1 | 1 | 1 | 1 | 1 |
| 7.50 | 0 | 1 | 1 | 1 | 1 | 0 | −0.50 | 1 | 1 | 1 | 1 | 1 | 0 |
| 7.25 | 0 | 1 | 1 | 1 | 0 | 1 | −0.75 | 1 | 1 | 1 | 1 | 0 | 1 |
| 7.00 | 0 | 1 | 1 | 1 | 0 | 0 | −1.00 | 1 | 1 | 1 | 1 | 0 | 0 |
| 6.75 | 0 | 1 | 1 | 0 | 1 | 1 | −1.25 | 1 | 1 | 1 | 0 | 1 | 1 |
| 6.50 | 0 | 1 | 1 | 0 | 1 | 0 | −1.50 | 1 | 1 | 1 | 0 | 1 | 0 |
| 6.25 | 0 | 1 | 1 | 0 | 0 | 1 | −1.75 | 1 | 1 | 1 | 0 | 0 | 1 |
| 6.00 | 0 | 1 | 1 | 0 | 0 | 0 | −2.00 | 1 | 1 | 1 | 0 | 0 | 0 |
| 5.75 | 0 | 1 | 0 | 1 | 1 | 1 | −2.25 | 1 | 1 | 0 | 1 | 1 | 1 |
| 5.50 | 0 | 1 | 0 | 1 | 1 | 0 | −2.50 | 1 | 1 | 0 | 1 | 1 | 0 |
| 5.25 | 0 | 1 | 0 | 1 | 0 | 1 | −2.75 | 1 | 1 | 0 | 1 | 0 | 1 |
| 5.00 | 0 | 1 | 0 | 1 | 0 | 0 | −3.00 | 1 | 1 | 0 | 1 | 0 | 0 |
| 4.75 | 0 | 1 | 0 | 0 | 1 | 1 | −3.25 | 1 | 1 | 0 | 0 | 1 | 1 |
| 4.50 | 0 | 1 | 0 | 0 | 1 | 0 | −3.50 | 1 | 1 | 0 | 0 | 1 | 0 |
| 4.25 | 0 | 1 | 0 | 0 | 0 | 1 | −3.75 | 1 | 1 | 0 | 0 | 0 | 1 |
| 4.00 | 0 | 1 | 0 | 0 | 0 | 0 | −4.00 | 1 | 1 | 0 | 0 | 0 | 0 |
| 3.75 | 0 | 0 | 1 | 1 | 1 | 1 | −4.25 | 1 | 0 | 1 | 1 | 1 | 1 |
| 3.50 | 0 | 0 | 1 | 1 | 1 | 0 | −4.50 | 1 | 0 | 1 | 1 | 1 | 0 |
| 3.25 | 0 | 0 | 1 | 1 | 0 | 1 | −4.75 | 1 | 0 | 1 | 1 | 0 | 1 |
| 3.00 | 0 | 0 | 1 | 1 | 0 | 0 | −5.00 | 1 | 0 | 1 | 1 | 0 | 0 |
| 2.75 | 0 | 0 | 1 | 0 | 1 | 1 | −5.25 | 1 | 0 | 1 | 0 | 1 | 1 |
| 2.50 | 0 | 0 | 1 | 0 | 1 | 0 | −5.50 | 1 | 0 | 1 | 0 | 1 | 0 |
| 2.25 | 0 | 0 | 1 | 0 | 0 | 1 | −5.75 | 1 | 0 | 1 | 0 | 0 | 1 |
| 2.00 | 0 | 0 | 1 | 0 | 0 | 0 | −6.00 | 1 | 0 | 1 | 0 | 0 | 0 |
| 1.75 | 0 | 0 | 0 | 1 | 1 | 1 | −6.25 | 1 | 0 | 0 | 1 | 1 | 1 |
| 1.50 | 0 | 0 | 0 | 1 | 1 | 0 | −6.50 | 1 | 0 | 0 | 1 | 1 | 0 |
| 1.25 | 0 | 0 | 0 | 1 | 0 | 1 | −6.75 | 1 | 0 | 0 | 1 | 0 | 1 |
| 1.00 | 0 | 0 | 0 | 1 | 0 | 0 | −7.00 | 1 | 0 | 0 | 1 | 0 | 0 |
| 0.75 | 0 | 0 | 0 | 0 | 1 | 1 | −7.25 | 1 | 0 | 0 | 0 | 1 | 1 |
| 0.50 | 0 | 0 | 0 | 0 | 1 | 0 | −7.50 | 1 | 0 | 0 | 0 | 1 | 0 |
| 0.25 | 0 | 0 | 0 | 0 | 0 | 1 | −7.75 | 1 | 0 | 0 | 0 | 0 | 1 |
| 0.00 | 0 | 0 | 0 | 0 | 0 | 0 | −8.00 | 1 | 0 | 0 | 0 | 0 | 0 |
| | $A_5$ | $A_4$ | $A_3$ | $A_2$ | $A_1$ | $A_0$ | | $A_5$ | $A_4$ | $A_3$ | $A_2$ | $A_1$ | $A_0$ | constant binary digital word F which is added to the resultant digital word C as part of the non-linear roundoff operation may similarly be converted using a preprogrammed ROM unit 54 into its mod 3 equivalent ($F_0$, $F_1$). Since the addition of F is a fixed operation associated with the roundoff operation, the conversion of the word F to its mod 3 equivalent may also be implicitly programmed within the checking unit 48. Finally, the digital word D, $D_0$–$D_5$, intermediate to the roundoff operation, may be converted to its mod 3 equivalent $D_{30}$, $D_{31}$ using the preprogrammed conversion unit 56. In addition, the conversion unit 56 may be used to convert the subset of D ($D_2$–$D_5$), which is the digital word E truncated from D, to its mod 3 equivalent ($E_{00}$, $E_{01}$). The checking unit 48 may be used to model the arithmetic functions of the multiplier 40 and adder 42 and compare the result of the model to the intermediate digital word D of the non-linear roundoff operation performed by the arithmetic unit 43.

Figure 4:
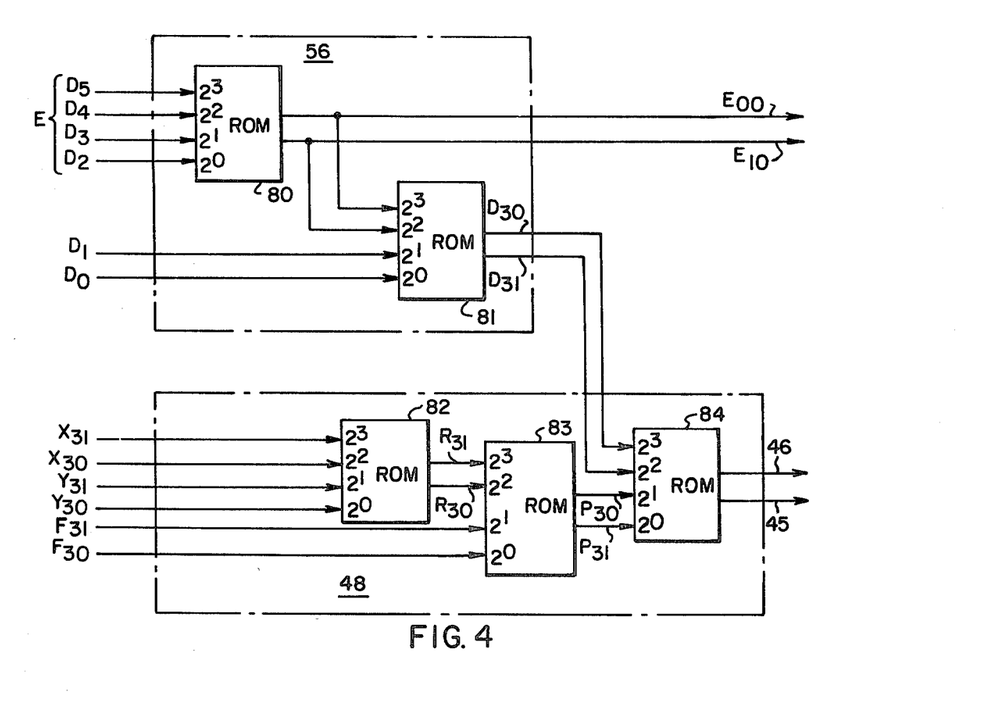
FIG. 4 is a schematic circuit diagram of an embodiment for a modulo 3 arithmetic model suitable for use in the embodiment depicted in FIG. 3.

Both, the conversion unit 56 and modeling unit 48 may be embodied with a combination of preprogrammed ROM modules similar to that shown in FIG. 4. Referring to FIG. 4, the signed digital word E ($D_2$–$D_5$) may be coupled to the address inputs ($2^0$–$2^3$) of a ROM 80 which may be similar to the type manufactured by Intersil Corp., Model No. 5624 having the addressable storage capacity of 16 4-bit words of which only 2 of the bits may be programmed. The outputs of ROM 80 provide the modulo 3 equivalent of the signed digital binary word E (i.e. $E_{00}$, $E_{01}$) which may be passed on to adjacent models of arithmetic units as will become clearer from the description found hereinbelow. In addition, the ROM 80 outputs are used as inputs to a similar ROM 81 which along with the two least significant bits $D_0$ and $D_1$ of the signed digital word D address the ROM 81 to form the mod 3 equivalent $D_{30}$, $D_{31}$ of the signed digital binary coded word D ($D_0$–$D_5$) at its output. Typical preprogramming of ROM's 80 and 81 suitable for use by this embodiment is shown in Table 4.

A look-up table may be preprogrammed into a ROM 82, similar to that shown in Table 4 below, such that when $Y_{30}$, $Y_{31}$, $X_{30}$ and $X_{31}$ are respectively connected to the $2^0$, $2^1$, $2^2$ and $2^3$ address inputs of the ROM 82, an emulation of the multiplication function 40 is effected producing the result $R_{30}$, $R_{31}$. In a similar manner, another ROM 83 is preprogrammed (see Table 4) to emulate the full adder function 42 of FIG. 3 when $F_{30}$, $F_{31}$, $R_{30}$, $R_{31}$ are respectively connected to the $2^0$, $2^1$, $2^2$, $2^3$ address inputs thereof. The modulo 3 coded results $P_{30}$, $P_{31}$ of the full adder emulation of ROM 83 are respectively connected to the $2^1$ and $2^0$ address inputs of another ROM 84. The mod 3 equivalent $D_{31}$, $D_{30}$ of the digital word D are respectively connected to the $2^2$ address inputs of the ROM 84.

The ROM 84 is preprogrammed to perform a comparison of the two mod 3 equivalent words $P_{30}$, $P_{31}$ and $D_{30}$, $D_{31}$ connected thereto. A typical programming set for ROM 84 is shown in Table 4. The contents of an addressed register in ROM 84 is output over lines 45 and 46 and may be indicative of a "stuck at" fault in either the arithmetic unit 43 or

TABLE 4

| ROM Inputs | | | | ROM Preprogramming | | | | |
|---|---|---|---|---|---|---|---|---|
| $2^0$ | $2^1$ | $2^2$ | $2^3$ | 80 | 81 | 82 | 83 | 84 |
| 0 | 0 | 0 | 0 | 00 | 00 | 00 | 00 | 01 |
| 0 | 0 | 0 | 1 | 01 | 01 | 11 | 01 | 00 |

TABLE 4-continued

| ROM Inputs | | | | ROM Preprogramming | | | | |
|---|---|---|---|---|---|---|---|---|
| $2^0$ | $2^1$ | $2^2$ | $2^3$ | 80 | 81 | 82 | 83 | 84 |
| 0 | 0 | 1 | 0 | 10 | 10 | 00 | 10 | 11 |
| 0 | 0 | 1 | 1 | 11 | 11 | 11 | 11 | 00 |
| 0 | 1 | 0 | 0 | 01 | 01 | 00 | 01 | 11 |
| 0 | 1 | 0 | 1 | 10 | 10 | 01 | 10 | 10 |
| 0 | 1 | 1 | 0 | 00 | 00 | 10 | 00 | 11 |
| 0 | 1 | 1 | 1 | 01 | 01 | 11 | 01 | 00 |
| 1 | 0 | 0 | 0 | 01 | 10 | 11 | 10 | 00 |
| 1 | 0 | 0 | 1 | 10 | 11 | 10 | 11 | 11 |
| 1 | 0 | 1 | 0 | 11 | 01 | 01 | 01 | 01 |
| 1 | 0 | 1 | 1 | 01 | 10 | 11 | 10 | 00 |
| 1 | 1 | 0 | 0 | 10 | 00 | 00 | 00 | 11 |
| 1 | 1 | 0 | 1 | 00 | 01 | 11 | 01 | 11 |
| 1 | 1 | 1 | 0 | 01 | 10 | 00 | 10 | 00 |
| 1 | 1 | 1 | 1 | 10 | 11 | 11 | 11 | 10 | model 44. A 0,1 or 1,0 code produced on signal lines 45 and 46 indicates a condition of "no fault"; a 1,1 or 0,0 code produced on signal lines 45 and 46 indicates a "fault" condition. In this embodiment, two bits of digital code are used to register a "fault" condition such to offer a self-checking feature. If either of the two output lines 45 or 46 of ROM 84 becomes "stuck at" a digital one or zero, a code of 0,0 or 1,1 will eventually be registered over lines 45 and 46 indicating a "fault" condition has occurred. In this manner, self-checking of checking unit 48 may be accomplished.

It is clear that the modeling of an arithmetic unit similar to that exemplified by unit 43 described in connection with FIGS. 3 and 4 may be extended to input digital words X and Y of any word lengths. For example, suppose that both X and Y are 12-bit digital binary words, then the modulo 3 equivalents of X and Y may be provided by ROM converters much the same as that described in connection with FIG. 1 for X represented by the bits $X_0$–$X_{11}$ and Y represented by the bits $Y_0$–$Y_{11}$. Such ROM converters yield the mod 3 equivalents of X and Y as $X_{30}$, $X_{31}$ and $Y_{30}$, $Y_{31}$, respectively, similar to the output of units 50 and 52 shown in FIG. 3. A specific embodiment which may be used to perform the function of the conversion unit 56 and emulating-/comparison function 48 for extended binary word lengths is shown in FIG. 5. The ROM modules shown in FIG. 5 all have the storage capacity of 512 4-bit words and may be of the type manufactured by Intersil Corp. Model No. 5625.

More specifically, the ROM modules 90 and 92 of FIG. 5 may be preprogrammed with look-up tables similar to those shown in Table 4 for ROM's 80 and 81 to provide a modulo 3 representation of E (12-bit binary) which is a subset of the most significant 12 bits ($D_{12}$–$D_{23}$) of the digital word D ($D_0$–$D_{23}$). The mod 3 equivalent of E ($D_{12}$–$D_{23}$) is denoted by either $E_{01}$, $E_{11}$ or $E_{00}$, $E_{10}$. The redundancy is provided to detect if "stuck at" fault in the outputs of ROM 92 has occurred. The bits $D_{19}$–$D_{23}$ may be connected to one set of address lines of ROM 90 to address a register therein which may be programmed to contain a digital code representative of the mod 3 equivalent of bits $D_{19}$–$D_{23}$ which may be output over signal lines $M_0$, $M_1$. Similarly, the bits $D_0$ to $D_3$ may be connected to another set of address lines of ROM 90 to address a register therein which may be programmed to contain a digital code representative of the modulo 3 equivalent of $D_0$–$D_3$ which may be output over signal lines $N_0$, $N_1$.

Signal lines $M_0$, $M_1$ along with bits $D_{12}-D_{13}$ may be connected to the address lines of ROM 92 to address a register therein which may be programmed to contain a digital code representative of the mod 3 equivalent, $E_{00}$, $E_{10}$ and $E_{01}$, $E_{11}$, of the digital word E ($D_{12}-D_{23}$). The signal lines $E_{00}$, $E_{10}$ and $E_{01}$, $E_{11}$, of the digital word E ($D_{12}-D_{23}$) may be connected to one set of the address lines of ROM 94 to address a register contained therein which may be programmed to contain an equivalence comparison test on the redundant mod 3 equivalents $E_{00}$, $E_{10}$ and $E_{01}$, $E_{11}$ of the digital word E ($D_{12}-D_{23}$). The results of the comparison test performed by ROM 94 may be output over signal lines denoted as COMPE0 and COMPE1 which may be, in turn, connected to a portion of the address inputs of ROM 98.

Signal lines $N_0$, $N_1$ along with the bits $D_4-D_6$ may be connected to another set of address lines of ROM 94 to address a register therein which may be programmed to contain the mod 3 equivalent of the digital word comprised of bits $D_0-D_6$ which may be output over signal lines $P_0$, $P_1$. The signal lines $P_0$, $P_1$, $E_{00}$, $E_{10}$ and the digital bits $D_7-D_{11}$ may be connected as address inputs to a ROM 96 to address a register contained therein which may be programmed with the mod 3 equivalent of D ($D_0-D_{23}$) which may be output over signal lines $D_{30}$, $D_{31}$.

The ROM's 90, 92, 94 and 96 of FIG. 5 have been assembled structurally to perform the function of the conversion unit 56 described in connection with FIGS. 3 and 4. The programming of the ROM's 90, 92, 94 and 96 is to be consistent with equations (3) and (4) shown above. Examples of this type of programming have been provided in Tables 2 and 4 also found hereinabove. It may also be appreciated by those skilled in the pertinent art that other ROM's having different storage capacities being similarly interconnected to perform the same function as that of conversion unit 56 may be equally suitable for the purposes of this embodiment.

The signal lines $D_{30}$, $D_{31}$, $X_{30}$, $X_{31}$ and $Y_{30}$, $Y_{31}$ may be additionally connected to a ROM 98 to address a register contained therein which may be programmed with the resultant code which indicates if a "stuck at" fault has occurred in either the arithmetic unit 43 or model unit 44 and which is output over signal lines 45 and 46. More particularly, ROM 98 may be programmed to implicitly emulate the functions of multiplying the modulo 3 equivalents of X and Y, denoted by $X_{30}$, $X_{31}$ and $Y_{30}$, $Y_{31}$, respectively; adding the modulo 3 equivalent of the roundoff constant F to the result of the multiplication; and perform the function of comparing for equivalence the modulo 3 addition result of the model with the modulo 3 equivalent of the digital word D, which is intermediate to the roundoff operation of the arithmetic unit 43. In addition, the ROM 98 implicitly compares the two mod 3 representative signals, $E_{00}$, $E_{10}$ and $E_{01}$, $E_{11}$ for equivalence. The ROM 98 may be programmed to output over signal lines 45 and 46 a digital code of 1,1 or 0,0 if either of the comparison checks performed implicitly thereby identifies a non-equivalence condition. The programming of ROM 98 is to be consistent with that exhibited in Table 4 above which is used in connection with the ROM modules 82, 83 and 84 as shown in FIG. 4.

NON-LINEAR EFFECTS—SATURATION

Figure 6:
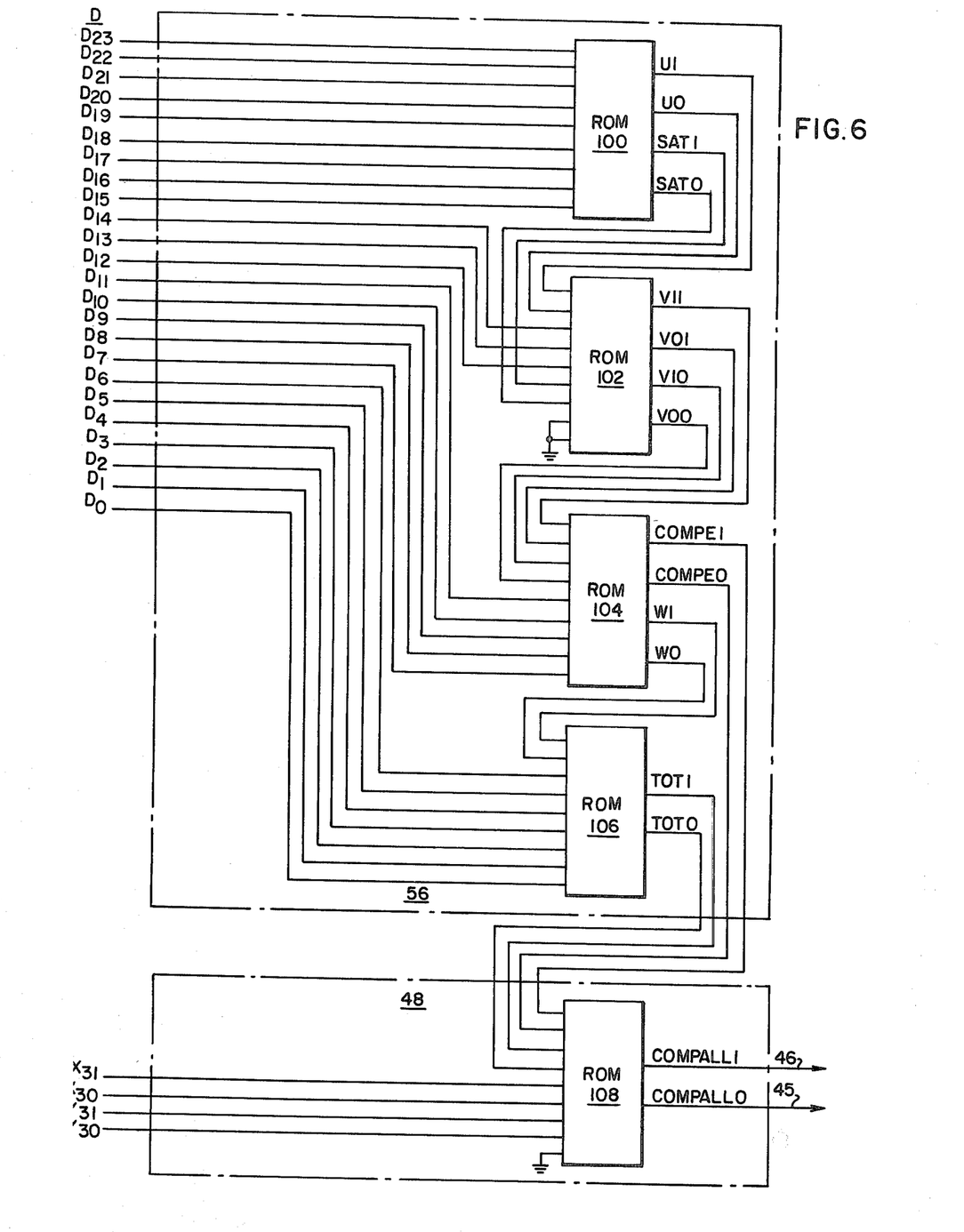
FIG. 6 is a schematic circuit diagram of a modulo 3 arithmetic model associated with a roundoff and saturation non-linear operation suitable for use in an embodiment similar to the one depicted in FIG. 3.

Typically, saturation effects cause substantial alterations of the frequency spectrum of a signal being processed. Consequently, saturation effects are generally eliminated in the design of digital processors. One of these design procedures will be discussed below. For the cases in which saturation is possible, the data is blanked and thus fault detection in a digital filter, for example, is not of interest. However, it is necessary to detect faults in the saturation detection circuitry. To illustrate a technique for solving a problem such as this, a 12×12 multiplier arithmetic type circuit will again be used and the additional assumption that the 12 bit rounded output is to be saturated at a known level determined by the most significant 9 bits will be made. FIG. 6 shows a reorganization of the circuitry in FIG. 5 to accomplish the saturation function. Table 5 found below shows the logic for a two bit saturation detection word denoted as SAT0, SAT1.

TABLE 5

|  | SAT0 | SAT1 |
|---|---|---|
| Failure | 0 | 0 |
| Saturation | 0 | 1 |
| No Saturation | 1 | 0 |
| Failure | 1 | 1 |

The ROM's used in the embodiment of FIG. 6 may be similar to the type used for the embodiment shown in FIG. 5. The logic contained in the ROM's in FIG. 6 is somewhat different than in FIG. 5 and thus requires some examination.

If any one of the inputs to ROM 100 sticks high or low such that (1) A word that was not to be saturated stays unsaturated then its modulo 3 representation changes as before ($2^j \neq 0$ mod 3) and ROM 108 may be programmed to detect the fault in accordance with its address inputs, or (2) A word that was not to be saturated becomes a word that should be saturated then, (SAT0, SAT1) becomes (0,1) and (U0, U1) is also altered. Since (U0, U1) is the modulo 3 representation of $D_{15}-D_{23}$ the modulo 3 representation of D changes which may be similarly detected by ROM 108 as programmed, (3) A word that was to be saturated stays as a word to be saturated, then the modulo 3 representation of the word changes and thus ROM 108 may also be programmed to detect this failure, (4) A word that was to be saturated becomes a word that would not be saturated, then (SAT0, SAT1) becomes (1,0) and (U0, U1) is altered. (U0, U1) changes the modulo 3 representation of D and thus ROM 108 may be programmed to detect this fault.

If U0 or U1 or any of its associated internal memory bits sticks high or low then the modulo 3 representation of D is changed and thus ROM 108 may again detect a fault.

If SAT0 or SAT1 or any of its associated internal bits sticks high or low then "no saturation" or "saturation" will be changed into "FAILURE" as illustrated in Table 5 shown above or will indicate the correct output depending on the data and which bit is stuck. For example, suppose that SAT1 sticks low. Then as long as no saturatable words occur we get the correct control output. If a saturatable word occurs then we get (0,0) as the output. This is fed as an address input into ROM 102 (as well as to the next mod 3 section of hardware for performing the saturation) which may be programmed such that (V00, V10)=(V01, V11) under these conditions. Thus ROM 104 may be programmed to detect a failure since (V00, V10)≠(V01, V11). This is fed to ROM 108 which may be programmed to give a fault indication for the whole function.

If the chip enable sticks high then (U0, U1) will not represent the modulo 3 of $D_{15}$–$D_{23}$ and thus ROM 108 may detect the fault.

ROM 102 computes the modulo 3 representation for the rounded off word to be passed to the next piece of hardware.

If U0, U1, $D_{12}$, $D_{13}$ or $D_{14}$ sticks high or low then the modulo 3 representation of D changes and ROM 108 may detect the fault.

If SAT0 or SAT1 sticks high or low then it either provides the correct input (non-relevant failure as long as the bit is stuck where it should be) or provides a (0,0) or (1,1) which alter (V01, V11) so that it does not match (V00, V10). Therefore, ROM 106 may be programmed to indicate a failure which addresses ROM 108 to output an indication of a failure over signal lines 45 and 46.

If either of the lower two bits of ROM 102 sticks high then the programming of ROM 102 may make (V00, V10)≠(V01, V11) and thus ROM 104 and ROM 108 may be programmed to indicate a fault condition.

If one of the output bits of ROM 102 or one of its corresponding internal bits sticks high or low then the (V00, V10)≠(V01, V11) and thus ROM 104 and ROM 108 may again as programmed indicate a fault.

If the chip enable on ROM 102 sticks high then the modulo 3 representation of D may be changed and thus ROM 108 will detect and provide an indication of the fault.

The discussion of "stuck at" faults for ROM's 104, 106 and 108 of FIG. 6 may be similar to the "stuck at" faults on ROM's 94, 96 and 98 of FIG. 5.

FIG. 6 illustrates an assembly of read only memories for doing complete fault detection of "stuck at" faults in an arithmetic function such as a multiplier having both roundoff and saturation non-linear effects present on the output word of the arithmetic unit.

NON-LINEAR EFFECTS—MODULO $2^m$ EFFECTS

One technique for removing the need for internal saturation logic to a hardware digital processor relies on the properties of modulo arithmetic. It is well known that if the output of a digital filter, for example, has m bits of dynamic range then the filter can be built without any saturation logic if (a) m bits are used at all internal points of the filter, and (b) The arithmetic is done modulo $2^m$ internal to the processor.

Figure 7:
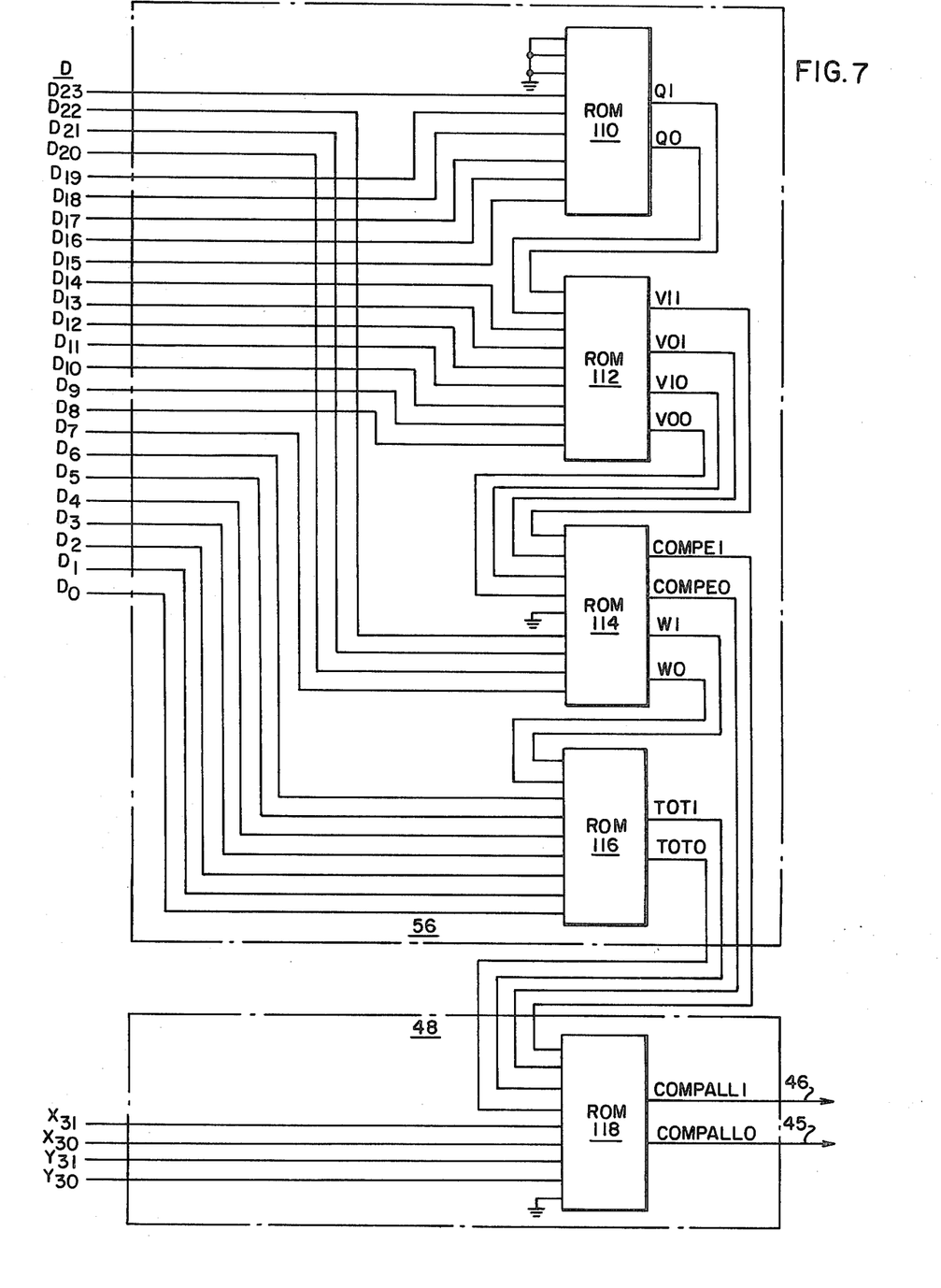
FIG. 7 is a schematic circuit diagram of a modulo 3 arithmetic model associated with a roundoff and modulo $2^m$ arithmetic non-linear operation suitable for use in an embodiment similar to the one depicted in FIG. 3.

It is felt important to show how to compensate for this modulo $2^m$ arithmetic in the context of the modulo 3 checking operations described above. Since the modulo 3 operations are linear, they cannot automatically compensate for mod $2^m$ arithmetic unless 3 is a factor of $2^m$. Since this is never true, we must have interaction between the actual filter and its modulo 3 representation. Below it will be shown that this interaction does not reduce the fault detection capability of this modulo 3 approach. The checking configuration as shown in FIG. 7 will be used to illustrate the correction for an arithmetic unit, such as a 12×12 bit multiplier. Suppose, for example, that the filter is set up to work modulo $2^{20}$. Then, there exists a twenty bit word $2^0$–$2^{19}$ and bits $2^{20}$, $2^{21}$, $2^{22}$, $2^{23}$ are moduled out of the result to be passed on to the next function. If a 12 bit output is still required, then bits from $D_{19}$ to $D_8$ are included. This is a somewhat different configuration than described in connection with FIGS. 5 and 6 above and thus an examination of the fault detection capability should be undertaken. The ROM's 110–118 shown in FIG. 7 may be of the same type used in the embodiments shown in FIGS. 5 and 6 above.

ROM 110 will be programmed to take the mod 3 of the input word $D_{15}$–$D_{19}$. Thus, if any of the top three bits sticks high, Q0, Q1 is changed. Since this is reflected as a change in the modulo 3 representation of D, which is denoted as T0T0, T0T1, ROM 118 may be programmed to detect the fault.

If any one of the bottom six bits of ROM 110 sticks high or low then the output Q0, Q1 will change, since it is the modulo 3 representation of $D_{15}$–$D_{19}$. Thus, the modulo 3 representation of D, T0T0, T0T1 changes which may be detected by ROM 118 as programmed.

If Q0 or Q1 or any one of its internal memory bits sticks high or low at the output of ROM 110 then the modulo 3 representation of D is likewise changed. Thus, ROM 108 may similarly detect a fault.

If the chip enable to ROM 110 sticks high, it causes Q0, Q1 not to represent the input address and thus the modulo 3 representation of D is changed. This may be similarly detected in ROM 108.

ROM 112 completes the computation of the modulo 3 representation of the word to go to the next stage similar to that described above in connection with FIG. 5. If any one of its input lines sticks high or low the modulo 3 representation of D is changed and thus detected in ROM 108 in accordance with its interaction therewith. If any one of the output bits from ROM 112 or one of its associated internal memory bits sticks high or low then (V00, V10)≠(V01, V11) and thus, ROM 114 may be programmed to detect an error. This may cause ROM 108 to detect an error in accordance with its interaction therewith.

If the chip enable to ROM 112 sticks high, the modulo 3 representation of D changes at the output of ROM 112 and thus ROM 118 may detect a fault.

The discussion of the "stuck at" faults for ROM 114, ROM 116 and ROM 118 is the same as for the configuration described in connection with FIGS. 5 and 6 and thus it appears that all "stuck at" faults associated with these three integrated circuit chips are also detectable. In ROM 114, the most significant bits of $D_0$–$D_{23}$ are added to the address input to form the mod 3 representation of the total multiplier operation so as to detect its complete operability. It is clear from the universal nature of the embodiments described in connection with FIGS. 5, 6 and 7 above that similar circuits are also constructable for addition and delay type linear operations.

FAULT DETECTION AND ISOLATION IN A NETWORK OF BINARY ARITHMETIC UNITS

Figure 8A:
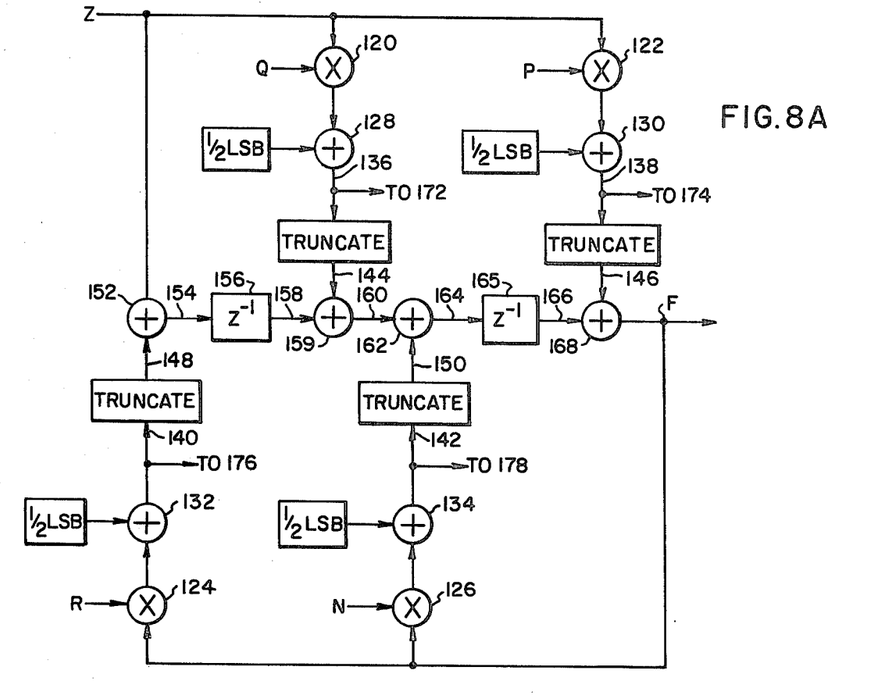
FIGS. 8A and 8B are schematic block diagrams exemplifying a network of arithmetic units and an associated modulo 3 emulation thereof for detecting and isolating static bit faults which may occur therein.

Digital filters which may be constructed from combinations of adders, delays, multipliers, roundoffs and saturates exemplify a network of binary arithmetic units which may be used in a digital processor. Thus the discussion above provides a first cut technique for performing the complete fault detection and isolation task for such a network of binary arithmetic units. It will be understood by those skilled in the pertinent art that the read only memory used to perform the fault detection and isolation task of such a network may be less than the combination of that shown in the FIGS. 3 and 5 above, for example. That is, if these elemental emulation and comparison functions were combined together, more memory would exist than required. This allows for less overall added hardware for filter type arithmetic networks than for the individual arithmetic units that comprise the digital filter network. FIG. 8A is illustrative of a network of arithmetic units depicted as a two-pole-two-zero digital filter and FIG. 8B exhibits a modulo 3 arithmetic model for detecting and isolating static bit faults in the network of FIG. 8A.

In describing the typical digital filter embodiment of FIG. 8A, let it be assumed that the input digital word Z and output digital word F may both be a 12 binary coded word and that all of the constant multipliers of Z, that is Q, P, R and N are likewise 12 bit binary coded words. Multiplication units 120 and 122 conventionally perform a digital multiplication of the input word Z by the filter constants Q and P, respectively. Likewise, multiplication units 124 and 126 conventionally perform a digital multiplication of the output word F by the filter constants R and N, respectively. Thus, for this embodiment, each of the multiplication functions 120, 122, 124 and 126 may typically result in products containing 24 bit binary coded words. The conventional addition functions 128, 130, 132 and 134 of each of the standard non-linear roundoff functions respectively associated with the typical multiplication functions 120, 122, 124 and 126 perform the addition of a digital word representative of one-half the least significant bit of the word to be truncated from the result of the additions to each of the products of the multiplication functions 120, 122, 124 and 126. The higher order 12 bits of each addition result 136, 138, 140, 142 from the corresponding adders 128, 130, 132 and 134 are truncated to form the digital words 144, 146, 148 and 150, respectively. The binary word 148 may be typically added to the input binary word Z using a full adder 152 and the resulting digital word 154 may be delayed through a conventional delay circuit 156. A delayed output 158 of circuit 156 may be added to the digital word 144 in a full adder 159 to produce a digital word 160 which may be added to the digital word 150 in a full adder 162 and the result 164 thereof may be delayed by another delay circuit 165. The delayed output digital word 166 of delay 165 may be added to the digital word 146 in the full adder function 168 to produce the output digital word F of the filter.

Figure 8B:
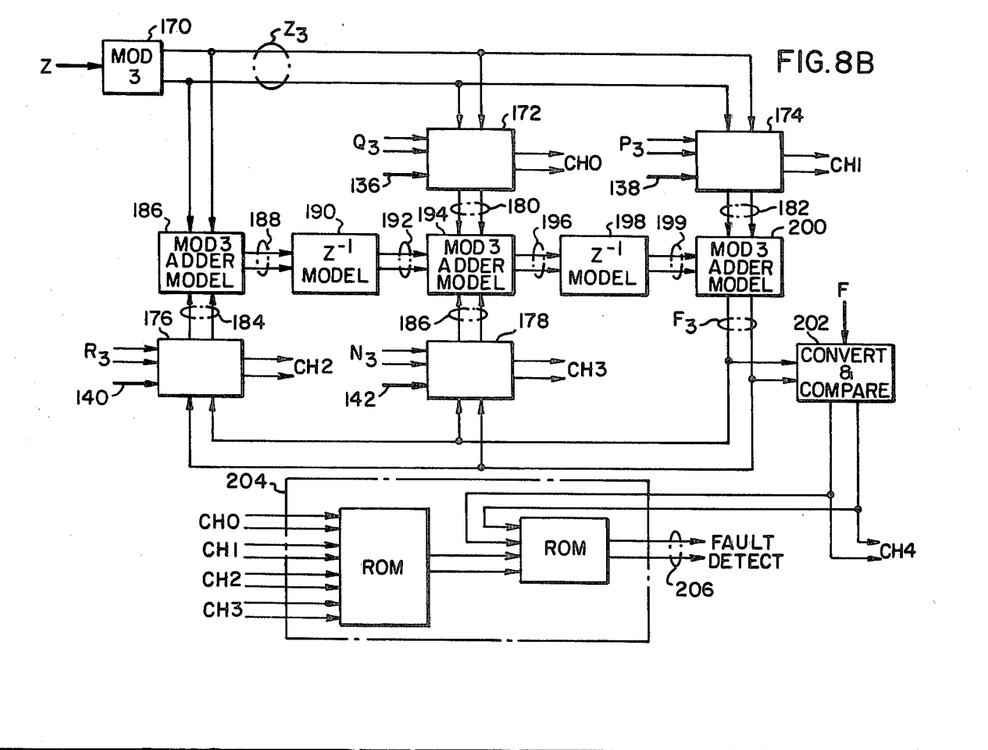

A modulo 3 equivalent model of the digital filter network embodiment of FIG. 8A is shown in FIG. 8B. Referring to FIG. 8B, the binary coded digital input word Z (i.e. $Z_0$–$Z_{11}$) may be converted to its modulo 3 equivalent $Z_3$ using a modulo 3 conversion unit 170 which is similar to the read only memory embodiment of FIG. 1 and programmed in accordance with equations (3) and (4) above. The multiplication functions 120, 122, 124 and 128 and non-linear roundoff operations associated therewith of the digital filter network are modeled in units 172, 174, 176 and 178 which are assembled and preprogrammed similar to that described in connection with FIGS. 3, 4 and 5 and Table 4 found hereinabove. Since the multipliers Q, P, R and N are assumed constant for the purposes of this embodiment their mod 3 equivalents denoted as $Q_3$, $P_3$, $R_3$ and $N_3$ may likewise be assumed as constants for the inputs to the modulo 3 equivalent models 172, 174, 176 and 178.

The interaction existing between the actual digital filter network and its modulo 3 equivalent is more than simply the input and output digital words which are conventionally utilized in most linear arithmetic unit networks. In the present invention, a digital word intermediate to each non-linear operation of the network of arithmetic units is preselected as an input to the corresponding unit which is used to emulate in modulo 3 arithmetic the arithmetic units employing the non-linear operations. In the case of the exemplary embodiment shown in FIG. 8B, the selected digital words intermediate to each non-linear roundoff operation are the resultants 136, 138, 140 and 142 corresponding to the roundoff addition functions 128, 130, 132 and 134. The selected interactionary digital words 136, 138, 140 and 142 are input to the modulo 3 modeling units 172, 174, 176 and 178, respectively, and are manipulated therein in a similar manner to the way the digital word D was handled in connection with the description of the embodiment shown in FIG. 5 above.

Modulo 3 equivalents 180, 182, 184 and 186 of the truncated portion of each of the interacting digital words 136, 138, 140 and 142 are yielded respectively from the modeling units 172, 174, 176 and 178 for use as inputs to other modeled arithmetic units. In addition, each of the modeling units 172, 174, 176 and 178 produces a two bit digital output word designated as CH0, CH1, CH2 and CH3 which provides information indicative of "stuck at" fault or no-fault conditions as related to the individual corresponding arithmetic and self-checking modeling units (see FIG. 5).

The modulo 3 models of the remaining arithmetic filter network utilize the mod 3 equivalent representations 180, 182, 184 and 186 as inputs. More specifically, the mod 3 equivalents $Z_3$ and 184 are modulo 3 added in a modeling unit 186 which may be a ROM programmed similar to the ROM 82 (see FIG. 4 and Table 4 above). The resultant mod 3 word 188 is delayed by a delay function 190 which functions synchronously with the delay unit 156 of the filter network shown in FIG. 8A. The delayed output modulo 3 word 192 from the delay model 190 is modulo 3 added with the mod 3 equivalents 180 and 186 using a mod 3 adder model 194, which may be a ROM programmed with a look-up table similar to that exhibited by Table 4 above, to generate a mod 3 resultant word 196. The modulo 3 coded word 196 is delayed by another delay function 198 which is operative synchronously with the delay unit 165 of the filter network shown in FIG. 8A. Another modulo 3 adder model 200, similar to the unit 186, is used to add the delayed output 199 of delay model 198 and the modulo 3 equivalent word 182 to produce an output $F_3$ of the filter model. The output $F_3$ is fed back as inputs to the multiplier modeling units 176 and 178. The output binary word F of the filter network is implicitly converted to its modulo 3 equivalent and compared for equivalence with the output $F_3$ of the digital filter model in a conversion/comparison unit 202. The unit 202 may be comprised of two read only memories having sufficient storage capacity to be preprogrammed with a look-up table for converting the 12 bit word F into its mod 3 equivalent and comparing the mod 3 equivalent of F with the modulo 3 coded output $F_3$ of the filter network model. A two bit output word CH4 is generated by the unit 202 to provide information indicative of a "stuck at" fault or no-fault condition as related to the network of arithmetic units 152, 156, 159, 162, 165 and 168 which do not employ non-linear operations and the corresponding self-checking network of modeling units 186, 190, 194, 198, 200, respectively associated therewith.

Each of the output words CH0, . . . CH4 are monitored by an "OR" function 204 which acts to detect any one or more indications of a static bit fault in either the digital filter network or self-checking model associated therewith. The "OR" function 204 generates a two bit word 206 which provides overall fault detection information. The "OR" function 204 may be comprised of two ROM's. One of the ROM's may have coupled to its address inputs the four 2-bit words CH0, CH3 and may be preprogrammed such to output a 2-bit coded word such as 0,0 or 1,1 if any of the words CH0, . . . CH3 connected to its inputs contain a 0,0 or 1,1 code. The 2-bit output of the ROM along with the 2-bit word CH4 may be connected to the address inputs of the second ROM of the "OR" function 204 which may be preprogrammed such to output the 2-bit word 206 with a code 0,0 or 1,1 of either or both of its input words exhibit a 0,0 or 1,1 code. A 0,0 or 1,1 code may also appear at the outputs of either ROM of the "OR" function 204 should any one of the ROM outputs suffer a "stuck at" fault. A 0,0 or 1,1 code exhibited on signal lines 206 is an indication that a "stuck at" fault has occurred in either the digital filter network or mod 3 self-checking model associated therewith.

In operation, if a "stuck at" bit fault should occur in any of the arithmetic units 120, 122, 124 and 126 or corresponding non-linear roundoff operations associated therewith, the fault will be manifested in the corresponding output word 136, 138, 140 or 142 intermediate to the non-linear operation thereof. Since these words 136, 138, 140 and 142 were preselected to interact with the filter network modeling units, 172, 174, 176 and 178, any fault manifested in the selected words will be detected by the modeling units and appear as a 0,0 or 1,1 code on the corresponding output word CH0, CH1, CH2 or CH3 which will ultimately result in a 0,0 or 1,1 code on lines 206, the output of unit 204. Thus, the fault may be detected and isolated back to its source in accordance with digital code of the output words CH0, . . . CH3. Note that a fault occurring in any one of the arithmetic units 120, 122, 124 or 126 or corresponding non-linear roundoff operators associated therewith will be detected only by the corresponding modeling unit 172, 174, 176 or 178 and will not be distributed to the other modeling units to cause false indications of fault detection thereby.

Likewise, if a "stuck at" bit fault should occur in any of the self-checking modeling units 172, 174, 176 or 178, it will be detected therein and an indication such as a 0,0 or 1,1 code will be generated in the corresponding output word CH0, . . . CH3 which will ultimately be detected by the "OR" function 204 and a 0,0 or 1,1 code will appear over the output lines 206. Similarly, once the fault is detected it may be isolated to either its arithmetic unit or corresponding modeling unit.

Should a "stuck at" fault occur in any of the arithmetic units 152, 156, 159, 162, 165, which do not employ a non-linear operation, or corresponding modeling unit 186, 190, 192, 198, 200 the fault will ultimately be detected in a non-equivalence comparison between the modulo 3 equivalent of the output word F and the modulo 3 output $F_3$ generated from the modulo 3 filter network model which is implicitly performed in unit 202. This non-equivalence comparison causes a 0,0 or 1,1 code to be generated in the output word CH4 which ultimately appears over signal line 206 as a result of the "OR" function 204. Similarly, once a "stuck at" fault is detected, it may be isolated to the network of arithmetic units which corresponds to the specific signal CH4 which is the source of detection of the "stuck at" fault. Again, it is observed that the detected fault condition will not be distributed to other groups of modulo 3 modeled arithmetic units in the overall filter network model.

Although the embodiment has been described in connection with a network of binary arithmetic units in the form of a two-pole-two-zero digital filter as shown in FIGS. 8A and 8B above, it is well understood by all skilled in the pertienent art area that there are other networks of arithmetic units utilized in digital processors to which the principles of the invention equally may be applied. Consequently, the invention should not be limited to any specific network of arithmetic units or specific hardware processor, but rather should reside in its broad scope as defined by the breadth of the claims attached herewith.

I claim:

1. A digital processor including apparatus for detecting a static bit fault condition therein, said processor comprising:

a first portion of arithmetic units including a set of non-linear operators for arithmetically operating on a first set of binary coded digital words to generate a plurality of output digital words which are correspondingly associated with said non-linear operations;

a second portion of arithmetic units for arithmetically operating on a second set of binary coded digital words and said output digital words generated from said first portion of arithmetic units to generate at least one output binary coded words;

means for converting said first and second set of binary coded digital words to their modulo 3 equivalents;

a first modeling means for detecting a static bit fault which may occur in said first portion of arithmetic units and said first modeling means by processing said modulo 3 equivalents of said first set of binary digital words in accordance with a modulo 3 emulation of the arithmetic operations of said first portion of arithmetic units to generate a set of modulo 3 coded results and by comparing said set of modulo 3 coded results and the modulo 3 equivalents of a correspondingly associated set of preselected binary digital words intermediate to the non-linear operations performed by said first portion of arithmetic units for non-equivalence, a non-equivalence condition being an indication of the existence of a static bit fault, said first modeling means being further operative to generate a third set of digital words which are the modulo 3 representatives of a predetermined portion of each of said preselected binary coded words, said predetermined portions being based on the non-linear operations from which the digital words were preselected; and a second modeling means for detecting a static bit fault which may occur in said second portion of arithmetic units and said second modeling means by processing said modulo 3 equivalents of said second set of binary digital words and said third set of digital words in accordance with a modulo 3 emulation of the arithmetic operations of said second portion of arithmetic units to generate at least one modulo 3 coded result and by comparing said at least one result and the modulo 3 equivalent of said at least one output binary word generated from said second portion of arithmetic units for non-equivalence, a non-equivalence condition being an indication of a static bit fault.

2. A digital processor in accordance with claim 1 wherein there is a non-linear operator corresponding to each arithmetic unit in said first portion; and wherein there is an output digital word and preselected intermediate digital word corresponding to each non-linear operation.

3. A digital processor in accordance with claim 2 wherein the first modeling means modulo 3 emulates the arithmetic operation of each arithmetic unit, said each modulo 3 arithmetic emulation processes the modulo 3 equivalents of their corresponding input binary words to generate a modulo 3 coded result wherein there exists a one-to-one correspondence between each preselected intermediate digital word from each non-linear operation and each generated modulo 3 coded result; and wherein the first modeling means compares each generated modulo 3 coded result and the modulo 3 equivalent of each corresponding preselected intermediate digital word for equivalence.

4. A digital processor in accordance with claim 1 wherein each unsigned binary digital word A of the digital processor having a word length of n bits may be represented by the formula:

$$A = \sum_{j=0}^{n-1} a_j 2^j$$

where $a_j$ may equal either 0 or 1;
wherein the means of converting each said binary digital word A to its modulo 3 equivalent includes at least one read only memory having coupled to its address inputs the binary bits of said digital word A and being programmed in accordance with the following formulas:

for n even;

$$A = \left\{ \sum_{j=0}^{\frac{n}{2}-1} (a_{2j} + 2a_{2j+1}) \right\} \bmod 3, \text{ and} \quad (1)$$

for n odd;

$$A = \left\{ \sum_{j=0}^{\frac{n-1}{2}-1} (a_{2j} + 2a_{2j+1}) + a_{n-1} \right\} \bmod 3, \quad (2)$$

such that the register in said at least one read only memory which is addressed by the binary bits of said digital word A contains a digital code which is representative of the mod 3 equivalent of said digital word A.

5. A digital processor in accordance with claim 1 wherein the binary digital words are coded in 2's complement binary; wherein the means for converting each 2's complement digital word A of the digital processor having a word length of n bits includes at least one read only memory having coupled to its address inputs the 2's complement binary bits of said digital word A plus one additional bit which is coupled to an address input of said at least one read only memory being registered between the sign bit and remaining bits of said digital word A and which is constantly representative of a zero binary value, said at least one read only memory being programmed in accordance with the following formulas, where m = n + 1:

for m even $$A = \left\{ \sum_{j=0}^{\frac{m}{2}-1} (a_{2j} + 2a_{2j+1}) \right\} \bmod 3, \text{ and}$$

for m odd $$A = \left\{ \sum_{j=0}^{\frac{m-1}{2}-1} (a_{2j} + 2a_{2j+1}) + a_{n-1} \right\} \bmod 3,$$

such that the register in said at least one read only memory which is addressed by said adapted digital word A contains a digital code which is representative of the mod 3 equivalent of said 2's complement binary digital word A.

6. A digital processor in accordance with claim 1 wherein at least one of said non-linear operators of said first portion of arithmetic units performs a roundoff operation on a digital word resulting from the arithmetic operation of one of said arithmetic units of said first portion, said roundoff non-linear operator including a digital adder for adding a predetermined digital word to the resultant of said one arithmetic unit; and a means for truncating a predetermined number of bits from the output digital word of said digital adder, said truncated digital word being the output digital word correspondingly associated with said roundoff non-linear operator and the output digital word of said digital adder being the preselected digital word intermediate to said roundoff non-linear operation.

7. A digital processor in accordance with claim 6 wherein the predetermined portion of said preselected binary word corresponding to said roundoff non-linear operator comprises the predetermined number of bits truncated from the output digital word of said digital adder.

8. A digital processor in accordance with claim 1 wherein the apparatus employed by the first modeling means to perform the modulo 3 emulation of at least one arithmetic unit comprises at least one read only memory having coupled to its address inputs the modulo 3 equivalents of the binary digital word inputs of said at least one arithmetic unit and being preprogrammed such that each register thereof contains the modulo 3 coded solution of the emulated arithmetic operation of its address inputs.

9. A digital processor in accordance with claim 1 wherein the apparatus employed by the second modeling means to perform the modulo 3 emulation of at least one arithmetic unit comprises at least one read only memory having coupled to its address inputs the modulo 3 coded inputs related to said at least one arithmetic unit and being preprogrammed such that each register thereof contains the modulo 3 coded solution of the emulated arithmetic operation on the modulo 3 coded inputs of its address.

10. A system for detecting and isolating a static bit fault in a digital processor comprised of a network of binary arithmetic units, a portion of which employing non-linear type operations, said system utilizing a plurality of input and output digital words of said digital processor in its performance, said system comprising:

means for converting said plurality of input and output binary digital words of said hardware digital processor into their modulo 3 equivalent digital words;

a first modeling means corresponding to each binary arithmetic unit of said network which employs a non-linear type operation, each first modeling means operative to process said modulo 3 digital equivalents of the input digital words of said corresponding binary arithmetic unit in accordance with the arithmetic operation performed thereby, each first modeling means being further operative to convert a preselected binary digital word intermediate of the non-linear operation performed by said corresponding arithmetic unit into its modulo 3 equivalent, each first modeling means being still further operative to generate a first output digital word which is representative of the modulo 3 equivalent of a portion of said preselected binary digital word which is related to the non-linear operation performed by its corresponding arithmetic unit and to generate a first error signal in response to a detected condition of non-equivalence between the result of said processing operation performed thereby and said modulo 3 equivalent of said preselected digital word, each first error signal being representative of a static bit fault in said corresponding pair of said first modeling means and non-linear type arithmetic unit;

a second modeling means for processing said first output digital words generated by each of said first modeling means and a predetermined set of said modulo 3 equivalent digital words, converted from the input and output binary digital words, in accordance with the functions of the remaining arithmetic units of said network which do not employ non-linear type operations to generate at least one second output signal being a modulo 3 coded digital word;

means operative to generate a second error signal in response to a detected condition of non-equivalence, between said at least one second output signal and said corresponding at least one modulo 3 digital word converted from the at least one output of said digital processor, said second error signal being representative of a static bit fault in said second modeling means and linear type arithmetic units; and means for monitoring each of said first modeling means and second modeling means to detect the presence of at least one of said first and second error signals, whereby the detection of an error signal indicates that a static bit fault has occurred in the operation of one of the hardware digital processor and modeling means and the presence of the particular first or second error signal will isolate which grouping of arithmetic and modeling unit is at fault within the network of arithmetic units of the digital processor and modeling units associated therewith.

11. A system in accordance with claim 10 wherein the binary digital words are coded in 2's complement binary; wherein the means for converting each 2's complement digital word A of the digital processor having a word length of n bits includes at least one read only memory having coupled to its address inputs the 2's complement binary bits of said digital word A plus one additional bit which is coupled to an address input of said at least one read only memory being registered between the sign bit and remaining bits of said digital word A and which is constantly representative of a zero binary value, said at least one read only memory being programmed in accordance with the following formulas, where $m = n + 1$;

for m even $$A = \left\{ \sum_{j=0}^{\frac{m}{2}-1} (a_{2j} + 2a_{2j+1}) \right\} \mod 3, \text{ and}$$

for m odd $$A = \left\{ \sum_{j=0}^{\frac{m-1}{2}-1} (a_{2j} + 2a_{2j+1}) + a_{n-1} \right\} \mod 3,$$

such that the register in said at least one read only memory which is addressed by said adapted digital word A contains a digital code which is representative of the mod 3 equivalent of said 2's complement binary coded digital word A.

12. A system in accordance with claim 10 wherein at least one of said non-linear operators of said network of arithmetic units performs a roundoff operation on a digital word resulting from the arithmetic operation of said arithmetic units employing said non-linear operator, said round-off non-linear operator including a digital adder for adding a predetermined digital word to the resultant of said corresponding arithmetic unit; and a means for truncating a predetermined number of bits from the output digital word of said digital adder, said output digital word of said digital adder being the preselected digital word intermediate to said roundoff non-linear operation and said truncated digital word being the predetermined portion of said preselected binary word as related to said roundoff non-linear operator.

13. A system in accordance with claim 10 wherein at least one of the first modeling means comprises at least one read only memory having coupled to its address inputs the modulo 3 representations of the input digital words of said corresponding binary arithmetic unit and being preprogrammed such that each register thereof contains the modulo 3 coded solution of the modeled arithmetic operation to be performed on the modulo 3 coded words of its address.

14. A system in accordance with claim 10 wherein at least one of the remaining arithmetic units is modulo 3 modeled in the second modeling means by at least a portion of one read only memory having coupled to its address inputs the modulo 3 coded inputs related to said at least one arithmetic unit and being preprogrammed such that each register thereof contains the modulo 3 coded solution of the modeled arithmetic operation to be performed on the modulo 3 coded words of its address.

15. A system in accordance with claim 10 wherein each first error signal generated by each of said first modeling means comprising two bits being coded equivalent in binary state; and wherein said second error signal also comprising two bits being coded equivalent in binary state.

16. A digital filter for processing an input binary coded digital word to generate an output binary coded digital word, said digital filter including apparatus for detecting and isolating a static fault condition which may occur therein, said digital filter comprising:
  a plurality of digital multipliers governed by the input and output digital words of said filter and a set of binary coded digital filter constants to generate a first set of intermediate digital words, each digital multiplier operative to roundoff its corresponding first intermediate digital word by adding a digital word of a predetermined binary value thereto to generate a second intermediate digital word and by truncating said second intermediate digital word to generate its corresponding roundoff result;
  a network of digital adders and digital delays forming the remaining arithmetic functions of said digital filter, said network being governed by the input digital word of said digital filter and the digital words representative of said roundoff results of the digital multipliers to generate the output binary coded digital word of said digital filter;
  a first modulo 3 modeling means corresponding to each digital multiplier, each of said first modeling means for emulating in modulo 3 arithmetic the multiplication and addition functions of the digital multiplier correspondingly associated therewith by processing the modulo 3 equivalents of the input binary words of said corresponding digital multiplier to generate a first modulo 3 resultant digital word, each of said first modeling means being further operative to compare the first modulo 3 resultant digital word generated thereby and the modulo 3 equivalent of said second intermediate digital word generated by its corresponding digital multiplier for a non-equivalence condition and to generate a first comparator output digital word having a binary code representative of the result of said comparison, each of said first modeling means being still further operative to generate a third digital word being the modulo 3 representation of the truncated portion of the second intermediate digital word formed by its corresponding digital multiplier;
  a second modulo 3 modeling means for emulating in modulo 3 arithmetic the addition and delay functions of said network of remaining arithmetic functions by processing the modulo 3 eqivalent of the input digital word of said digital filter and said third digital words to generate a modulo 3 resultant output word, said second modeling means being further operative to compare said modulo 3 resultant output word and the modulo 3 equivalent of the output digital word of said digital filter for a non-equivalence condition and to generate a second comparator output digital word having a binary code representative of the results of said comparison; and
  means for monitoring said first and second comparator output digital words to detect a non-equivalence condition in at least one of said comparisons which is representative of an occurrence of a static bit fault in said digital filter, said particular at least one of said first and second comparator output digital words which reflects the non-equivalence condition isolates the fault within the digital filter.

17. A digital filter in accordance with claim 16 wherein the binary digital words are coded in 2's complement binary; wherein the digital filter includes a means for converting each 2's complement digital word A of an n bit word length comprising at least one read only memory having coupled to its address inputs the 2's complement binary bits of said digital word A plus one additional bit which is coupled to an address input of said at least one read only memory being registered between the sign bit and remaining bits of said digital word A and which is constantly representative of a zero binary value, said at least one read only memory being programmed in accordance with the following formulas, where $m = n+1$:

for m even $$A \equiv \left\{ \sum_{j=0}^{\frac{m}{2}-1} (a_{2j} + 2a_{2j+1}) \right\} \mod 3, \text{ and}$$

for m odd $$A \equiv \left\{ \sum_{j=0}^{\frac{m-1}{2}-1} (a_{2j} + 2a_{2j+1}) + a_{n-1} \right\} \mod 3,$$

such that the register in said at least one read only memory which is addressed by said adapted digital word A contains a digital code which is representative of the mod 3 equivalent of said 2's complement binary digital word A.

18. A digital filter in accordance with claim 16 wherein each first modeling means comprises at least one read only memory having coupled to its address inputs the modulo 3 representations of the input digital words of said corresponding digital multiplier and being preprogrammed such that each register thereof contains a modulo 3 coded solution in accordance with the corresponding modulo 3 arithmetic operation to be performed on the modulo 3 words of its address.

19. A digital filter in accordance with claim 16 wherein the second modeling means includes at least one read only memory for emulating the function of the digital adders, said at least one read only memory having coupled to its address inputs the modulo 3 representations related to the inputs corresponding to the digital adders being emulated and being preprogrammed such that each register thereof contains a modulo 3 coded solution in accordance with the corresponding modulo 3 arithmetic operation to be performed on the modulo 3 words of its address.

20. A digital filter in accordance with claim 16 wherein each of the first and second comparator output words comprises two bits of binary code, said binary bits being equivalent to represent a non-equivalence comparison condition.

* * * * *